Nov. 10, 1931.   F. H. JOHNSON   1,831,007
SPRINKLER SYSTEM
Filed March 12, 1929   3 Sheets-Sheet 1

INVENTOR:
Frederick H. Johnson,
BY
ATTORNEY

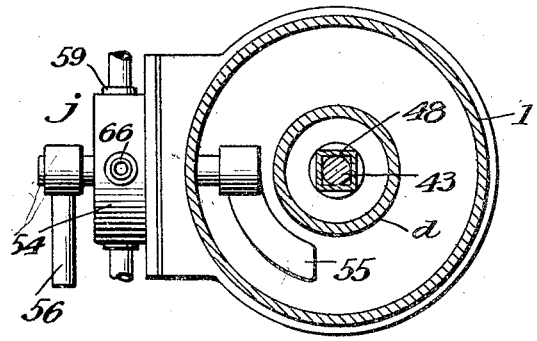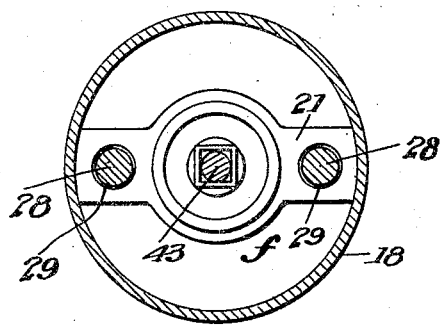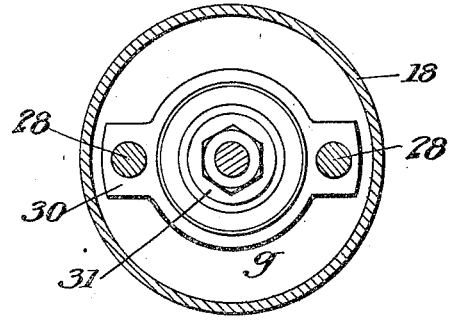

Patented Nov. 10, 1931

1,831,007

UNITED STATES PATENT OFFICE

FREDERICK H. JOHNSON, OF SOUTH PASADENA, CALIFORNIA, BY DECREE OF DISTRIBUTION TO FRANK W. JOHNSON, ASSIGNOR TO HADDEN COMPANY, LTD., OF ALHAMBRA, CALIFORNIA, A CORPORATION OF CALIFORNIA

SPRINKLER SYSTEM

Application filed March 12, 1929. Serial No. 346,376.

This invention relates to sprinklers, and more particularly to sprinkler systems adapted to operate automatically and in sequence. More particularly, the invention contemplates a sprinkler system incorporating a plurality of sprinklers situated at different remote points, of say, a field, with one of said sprinklers adapted to operate at a time or for that matter any given number of said sprinklers adapted to operate at a given time immediately followed by other sprinklers coming into operation, the invention having its means and elements so arranged that upon the completion of a sprinkling operation by a given set of sprinklers, the other sprinklers are automatically brought into action by the discontinuance in operation of the last named sprinklers.

An object of the invention is the provision of a sprinkling system provided with a plurality of sprinkler heads which, when mounted in the ground, present no obstruction above the normal ground level, to the end that a mowing of the lawn is easy of accomplishment.

Another object is the provision of a sprinkling system adaptable for golf courses, in that it offers no obstruction to the vision or the play of the game.

Another object is the provision of a sprinkler system suitable for grass fields, such as now used for the landing and taking off of aeroplanes.

Another object is the provision of a sprinkler system and its associated nozzle which is so constructed as to give the greatest possible fluid throw.

Another object is the provision of a sprinkler system and means having the ability to efficiently handle and use high pressures of fluid.

Other objects will appear as the specification proceeds, among which objects is the provision of a sprinkler system and means which is simple of construction, positive in operation, and generally superior to systems now known to the inventor.

With the above and other objects in view, the invention consists in the novel and useful provision, formation, construction, association and relative arrangement of parts, members and features, all as shown in a certain embodiment in the accompanying drawings, described generally, and more particularly pointed out in the claims.

In the drawings:

Figure 1 is a vertical sectional view of one of the sprinkler units,

Figure 2 is a plan view of the showing of Figure 1,

Figure 3 is an enlarged cross sectional view on the line 3—3 of Figure 1,

Figure 4 is a top plan view of the member shown in Figure 5,

Figure 5 is a fragmentary side elevation of the member shown in Figure 4,

Figure 12:
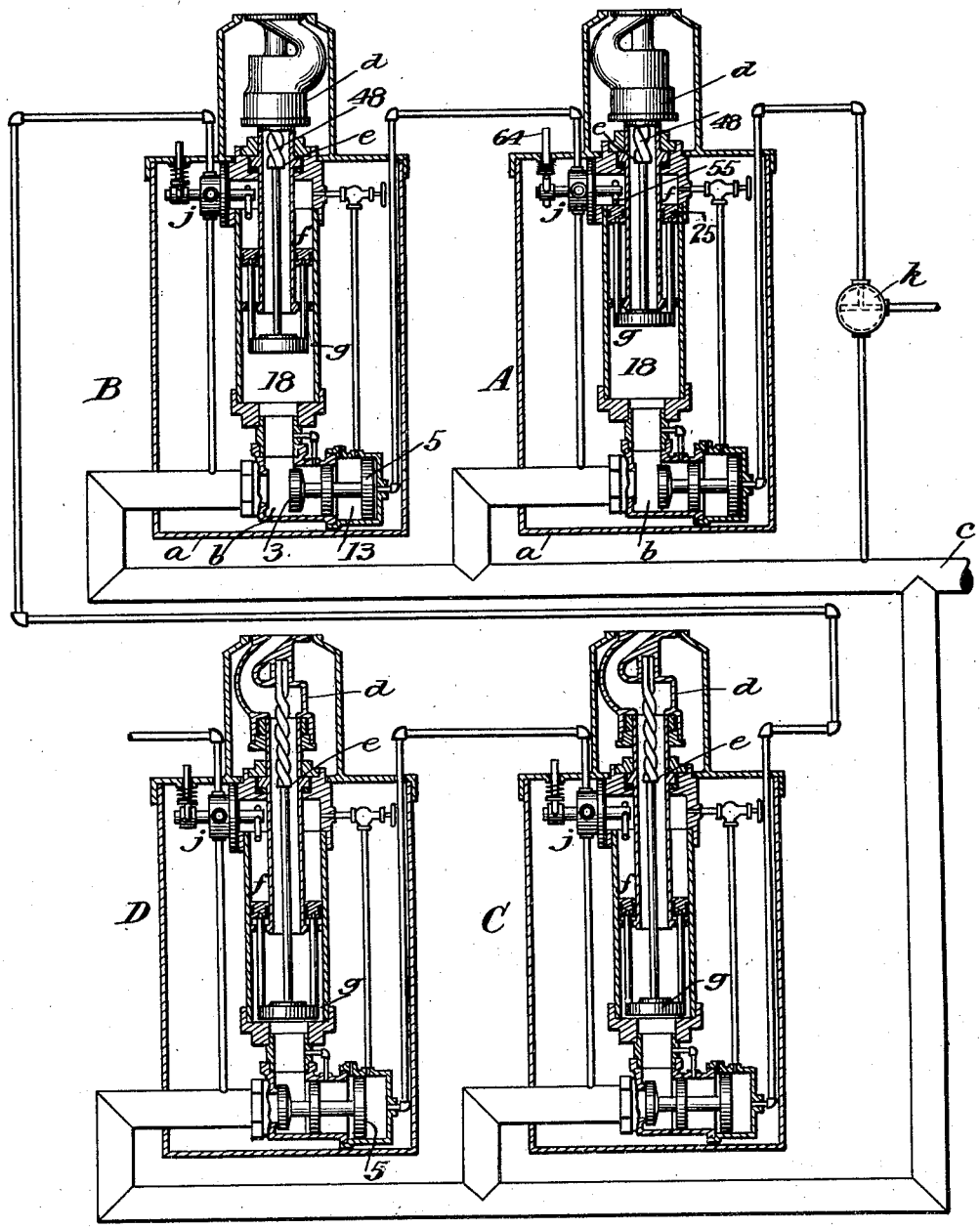

Figure 6 is a cross sectional view of a valve device, the same being taken on the line 6—6 of Figure 1, Figure 7 is a plan view of the device shown in Figure 8, Figure 8 is a fragmentary side elevation of the device shown in Figure 7, Figure 9 is a cross sectional view on the line 9—9 of Figure 1, Figure 10 is a cross sectional view on the line 10—10 of Figure 1, Figure 11 is a cross sectional view on the line 11—11 of Figure 1, and Figure 12 is a vertical sectional view of four units of the invention coupled for successive operation.

Referring now with particularity to the drawings, the unit shown in Figure 1 is designated as an entirety by A. As before stated, this unit which constitutes a sprinkler is adapted for placement in certain instances within the ground and below the surface of the ground and in such position that the sprinkler portion thereof may direct water above the surface of the ground. While this device A may operate as a single unit, still the device is adapted to operate with a plurality of units, such as shown in Figure 12, the feature of the invention being to provide a sprinkler system which overcomes effectively numerous disadvantages now existing in sprinkler systems known to the inventor. A few of the disadvantages in existing systems may be pointed out—for instance, the nozzle members more often than not are operated and controlled by gears, vibrating valve seats, and other semi-positive forces, whereas the present invention is independent of all these elements and is so constructed as to eliminate whipping effects of the nozzle stream to the end that maximum distance in the throw of fluid results.

The device A includes a casing *a* adapted to house an intake valve *b* which in turn is associated with a source of supply pipe *c* for directing fluid under pressure to said valve; a nozzle *d*, means *e* adapted to cause rotation of said nozzle, means designated generally as *f* whereby fluid passed by said intake valve may be directed to the nozzle *d*, means *g* for cutting off the supply of fluid through the nozzle and the means *f*, means *h* controlling the duration of flow of fluid through the nozzle, means *j* constituting a valve adapted to be operated to cause operation of a further unit when the first unit has performed a given operation, all of which elements may be utilized in practicing one embodiment of the invention.

The casing *a* may be conventional in form and is of such shape as to best house the elements above mentioned. This particular casing is adapted to be placed within the ground or other convenient place and in such position that the nozzle portion *d* will have its orifice either slightly below or at the surface of the ground. In this connection, the casing is formed with an extension 1 of a diameter best adapted to hold the nozzle, this part 1 forming a part of the cover 2 for the casing. Furthermore, this construction allows dirt or other material to be banked around the part 1 and upon the cover 2 for holding the same within the ground. The device is adapted to operate in any position, although in the present instance, it is to be supposed that the casing extends vertically upward within an object adapted to receive the same. The intake valve *b* is of the differential type, in that it provides discs 3, 4, and 5 of different diameters and secured to stems 6 and 7 adapted to maintain said discs in separated relation. The disc 3 constitutes the valve, whereas the discs 4 and 5 constitute pistons. This valve is adapted to be housed within the housing 8, the housing having bores 9 and 10, the bore 10 being in direct communication with the valve 3, and the wall of the housing bounding said bore 10 is formed with a valve seat 11 for receiving the valve 3. Furthermore, the source of fluid supply pipe *c* is adapted to communicate with the bore 10. The housing is provided with a cylinder portion 12 of greater diameter than the diameter of the bore 10 and this cylinder portion is adapted to confine the piston 4. Connected with the housing in axial alignment with the cylinder 12 is a cylinder 13 of greater internal diameter than the internal diameter of the cylinder 12 and this latter cylinder receives the piston 5. Between the cylinders and communicating exteriorly and interiorly thereof is a vent opening 14. The housing is formed to secure a tubing 15 in communication with the bore 9, which tubing in turn secures a flanged base member 16 constituting a portion of the means *f*. A by-pass line 17 is in communication with the interior of the tubing 15 and the interior of the cylinder 12.

The means *f* contemplates in addition to the base 16, a tubular casing or housing 18 secured to the base and to a cap or head member 19. Also said means includes a nozzle tube 20 substantially concentric within the casing or tubing 18 and which nozzle tube 20 at its lower end is provided with a webbing 21, which may or may not be rigidly secured to the member 18. This nozzle tube is formed with a flange 22 and which flange is adapted to rest upon a gasket 23 seated on a shoulder of the cap 19. Furthermore, this nozzle tube extends within the housing 1 and a nut or equivalent means 24 is adapted to hold the tube 20 to the cap 19 and also positions the same within the member 1. Within the member 18 and constituting part of the means *g* is a piston 25, this piston being of the annular type and adapted to surround the tube 20. This piston is provided with the usual packing shown at 26 and 27. One or more stems 28 are passed through openings 29 in the webbing 21, as best shown in Figure 10, and which stems are secured to the piston at one end while the opposite ends of said stems are secured to a valve member 30, also constituting a portion of the means *g*. This valve member includes a valve 31 secured to a cross arm member 32 (see Figure 11). This movement of the piston in an upward direction will likewise cause upward movement of the cross arm due to the connection between the piston and said cross arm through the medium of the member 28, and the valve 31 is adapted to be seated against the seat portion of the nozzle tube when the uppermost excursion of the piston has been reached.

Carried at the upper end of the nozzle tube 20 is the nozzle head *d*. The means of connection between the nozzle head and the tube 20 is somewhat different in the showing of Figure 12 from that shown in Figure 1. In Figure 1, an annular flanged member 33 suitably fixed within the extension 1 has its flange 34 in engagement with the periphery of the tube 20, and is provided with a lateral extension 35, normally capped and confining a spring pressed plunger 36 which cooperates with a toothed ring 37, secured to the nozzle head *d* and surrounding the tube 20 to permit rotation of the nozzle head in only a single direction. This member 33 is adapted to also hold the nozzle *d* against outward movement, to which end a suitable connection is provided between said member and said nozzle head. This nozzle has a definite design in that the mouth 38 thereof is substantially ellipsoidal in cross section and lies in the same longitudinal axis as the nozzle tube 20. The mouth portion forms a terminus for the nozzle duct 39, which is at an acute angle relative to the central axis. For instance, the said duct has a portion directly communicating with the interior of the tube 20 and which duct is curved, as shown at 40 and then directed to the mouth. The member 1 is so formed as to closely confine the mouth portion within the nozzle, the side walls of said member 1 to this end being bent inwardly and flanged, as shown at 41, while the mouth portion of the nozzle is flanged, as shown at 42.

The means e contemplates a device adapted to rotate the nozzle during passage of fluid through said nozzle. Said means includes a two-part stem 43—44, the part 44 being secured to the cross arm 32 by pinning or otherwise securing, as shown at 45, and the part 43 being capable of slight longitudinal movement relative to the part 44. A cup 46 surrounds the adjacent end portions of the stem parts 43, 44 and a coil spring within said cup serves to urge the stem part 43 in the direction of the stem part 44 whereby suitable formations on the ends of the stem parts are normally interengaged to prevent rotation of the stem part 43 relative to the stem part 44. The upper end of the stem 43 is provided with a head 47, the head 47 having angularly related side portions. In the drawings, the head is substantially square. This head is adapted to be received within a twisted tube 48, concentrically received within the tube 20 and pinned or otherwise secured to an enlarged portion of the nozzle, as shown at 49. Inasmuch as the twisted tube is substantially square in cross section as shown in the drawings (see Figure 4), it is obvious that when the squared head is pushed upwardly within said tube and by reason of the fact that under such conditions the stem part 43 is held against rotation, the tube 48 will be rotated and the nozzle d will rotate therewith in the direction permitted by the plunger 36. On the other hand, upon downward movement of the stem part 44, said stem part will move slightly away from the stem part 43 thereby disengaging the formations at the adjacent ends of said stem parts to permit the stem part 43 to move downward by a combined longitudinal and rotative movement without rotating the tube 48. In Figure 12, a single stem is utilized in place of the two-part stem, the stem being directly connected to the member 32. By this arrangement the tube 48 is rotated upon both upward and downward movements of the stem as is manifest.

The means h includes a regulator valve 50 adapted to control passage of fluid between pipes 51 and 52, the pipe 51 communicating with the interior of the casing, housing or cylinder 18 adjacent the top thereof, as shown at 53, while the pipe 52 communicates with the interior of the cylinder 13.

The means j includes a valve 54, and means 55 and 56 for moving said valve. The valve is of the three-way type and includes a valve housing 57 provided with ports 58, 59 and 60. The ports 58 and 60 are in substantial alignment while the port 59 is substantially 90 degrees from either the port 58 or 60. Within the casing or housing is a valve disc 61. This disc is capable of being turned so that fluid may pass directly through the port 58 to the port 60, the port 59 being closed, as shown in Figure 6, but upon rotation of the disc, the ports 59 and 60 may communicate, the port 58 being closed. This disc is mounted upon a stem 62 passed through the housing and one end of said stem carries the means 55 constituting an arm and the opposite end of said stem carries the means 56 likewise constituting an arm. This casing or housing is suitably secured to the member 15, as shown at 63. A spring pressed plunger 64 is carried by the cap 2, and has its head portion in position for engagement with the arm 56, as shown in Figure 3. A pipe 65 permits communication between the port 58 and the interior of the source of supply pipe c. Another pipe 66 communicates with the port 60. Considering another unit, the pipe 66 would be in communication with the interior of the cylinder 13 of said other unit, as for instance, the pipe shown in Figure 1 at 67. This pipe would be the pipe 66 leading from a unit preceding the one shown in Figure 1.

The operation, uses and advantages of the invention just described are as follows:

First, referring to Figure 1, assume that fluid under pressure is in the conduit c and exerting pressure against the valve 3. The valve, however, remains seated due to pressure of fluid exerted against the piston 5. It will be observed that there is a differential action and that the pressure exerted against the head of the piston would be greater than the pressure exerted against the valve, due to difference in areas. If now the pressure against the piston 5 was released, the valve would open. Assume that the valve means j for a preceding unit has been turned so that the pipe 66 shown at 67 permits the fluid within the cylinder 13 to exhaust therefrom through the port 59. When this occurs, the fluid in the source of supply pipe c will be received within the housing 8 and flow upwardly through the opening 9 and into the casing or cylinder 18 where such fluid will contact with the piston 25. The piston due to this pressure will then commence its excursion upwardly and as this piston moves, the cross arm 30 connected to said piston by means of the members 28 will likewise move upwardly. This upward movement will lift the stem 43 and the square head on said stem will travel within the twisted tube 48 and cause the same to rotate. This rotation will be communicated to the nozzle and the fluid received within the cylinder 18 will be directed through the nozzle tube 20 into the port 39 and outwardly of the mouth 38 of said nozzle and will fly out at an angle relative to the top surface of the nozzle. Thus, as the nozzle turns, the spray or fluid stream will be passed over a given area. The piston will continue to move upwardly within the cylinder 18 and after it has reached a certain point, will strike the arm 55 and will move the arm to cause rotation of the shaft or stem 62. As this is moved, the valve disc will be turned within the housing. The next sequence will not be described at this point. During the upward movement of the piston, any fluid back of said piston will be directed through the pipe 51 back into the cylinder 13 and the rate at which said fluid may be exhausted back of the piston is regulated by the valve 50. Thus, it is possible to rotate the nozzle at any speed desired, in accordance with the adjustment of the valve 50. To restore the device to the position shown in Figure 1 after the nozzle has made a revolution, fluid under pressure may be exerted through the pipe 66, shown at 67, against the piston 5, and this fluid will be passed through the pipes 51 and 52 past the valve 50 and above said piston. This fluid under pressure will cause the piston 5 to move and seat the valve 3 upon its seat 11. Fluid under pressure below the piston 25 will be forced downwardly into the by-pass pipe 17 and out through the relief port 14. This in brief constitutes the operation of the device.

Referring to Figure 12, I have for the purpose of illustration shown four of the units A and here designated as A, B, C and D, with all of said units identically constructed. The source of fluid supply c is directly connected to all of said units. The valve shown at k is what may be termed a master valve, and is usually situated at some remote point so that an operator may adjust said valve or turn the same on to operate the various sprinklers. This valve is identical in construction with the valve constituting a portion of the means j, which is to say it is of the three-way type. In Figure 12, the unit A shows the nozzle as having made a complete revolution and the piston 25 has tripped the arm 55 and caused fluid back of the piston 5 in unit B to be exhausted through the port 59 of unit A, whereupon the fluid in the supply pipe has entered within the cylinder 18 and moved the piston upwardly within said cylinder and the said nozzle has made approximately a half revolution. Units C and D are closed, due to the fact that piston 25 of unit B has not yet tripped the valve j to exhaust fluid in back of the piston 5 of said unit C. After all of the units have been operated, it is obvious that many more units may be operated, and all of said pistons will be in an upward position substantially as shown by unit A in Figure 12. When this condition is reached, the valve k may be turned so that fluid under pressure from the source of supply line will automatically seat the valves 3 and cause a downward movement of the piston 25 within the cylinder 18. When this occurs for the unit A, the spring actuated plunger 64 will urge the valve j to operate in such a manner as to have fluid under pressure directed from the source of fluid supply into the cylinder 13 of unit B and cause said valve 3 of said unit to seat, and so on for the next unit. If desired, however, the operation of the valve k might be made automatic after all of the units have operated. It is obvious from the description so far given that each unit will perform its operation and then stop flow of water or other fluid from its nozzle prior to the next unit operating, and that each unit operates in sequence. Thus, it is possible to provide a series of units all acting together followed by a second series or agroupment of units acting together. It is also possible to regulate the turning movement of the nozzle so that instead of making a complete revolution, only a half revolution is made. This, of course, is done by regulating the degree of twist in the member 48. However, in the showing of Figure 12, each unit will operate and then stop operation after the nozzle has made a complete revolution. When it is desired to restore the system, it is only necessary to turn the valve k so that the system is restored, whereupon operation may again be commenced.

In summary, it will be seen that I have provided an automatic sprinkler system in which the automatic operation of individual sprinklers occurs in successive sequence. I have also provided means for starting in motion a succeeding unit after a preceding unit has substantially completed its performance, and that the rate of movement of the nozzle of each unit may be independently regulated, so that either high speed or slow speed may be effected at will of an operator. Furthermore, the sprinkler can be regulated so that it will make a half, quarter, or full turn, as may be desired.

Another feature of importance is the nozzle itself, in which the mouth lies in the same vertical axis as the nozzle tube 20 with the duct portion formed in the nozzle revolving at an angle to the axis, with the result that there is very small mouth travel, thus adapting this particular type of sprinkler for the various uses enumerated in the statement of objects of the invention.

It is obvious that various changes and modifications and variations may be made in practicing the invention in departure from the particular showing of the drawings without departing from the true spirit thereof.

I claim:

1. In a sprinkler device, a rotatable sprinkler head, means for supplying fluid to the sprinkler device to be discharged through said sprinkler head, means movable by fluid supplied to the device for automatically cutting off the discharge of fluid through said sprinkler head following a predetermined sprinkling period, and means whereby movement of said cut-off means rotates said sprinkler head.

2. In a sprinkler device, a rotatable sprinkler head, means holding said sprinkler head against movement in the direction of the axis of rotation thereof, a spiral member carried by said sprinkler head, a piston movable by fluid supplied to the sprinkler head, and a connection between said piston and said spiral member whereby movement of the piston rotates the sprinkler head.

3. A sprinkler device comprising a rotatable sprinkler head, means for directing a flow of fluid to said sprinkler head, and fluid operated means cooperating with said sprinkler head to effect rotation thereof during a predetermined period and thereafter automatically operable to cut off flow of fluid to said sprinkler head.

In testimony whereof, I have signed my name to this specification at Los Angeles, California, this 23 day of February, 1929.

FREDERICK H. JOHNSON.